Dec. 8, 1970 R. W. REICH 3,546,625

ELECTRONIC CLOCK WITHOUT MECHANICAL VIBRATOR OR REGULATOR

Original Filed Feb. 17, 1967

United States Patent Office 3,546,625
Patented Dec. 8, 1970

3,546,625 ELECTRONIC CLOCK WITHOUT MECHANICAL VIBRATOR OR REGULATOR

Robert Walter Reich, 143 Merzhauser St., Freiburg im Breisgau, Germany

Continuation of application Ser. No. 616,976, Feb. 17, 1967. This application Feb. 7, 1969, Ser. No. 800,034
Int. Cl. H03b 5/26
U.S. Cl. 331—110 5 Claims

ABSTRACT OF THE DISCLOSURE

An electronic timing circuit is disclosed in the form ot a bridge with two transistors, each collector-emitter circuit forming two branches of the bridge. The circuit is designed so that a first transistor controls the timing of the other. The circuit is so designed that neither transistor conducts until an output pulse is produced and both transistors cut off at the termination of the output pulse.

This application is a streamlined continuation of copending application Ser. No. 616,976, now abandoned.

The invention relates to an electronic circuit arrangement comprising transistors and other electronic components which transmits precise time pulses to a simple stepping device. The stepping device proper solely consists of a seconds wheel with 60 teeth in saw-tooth shape, the minutes and the hour wheel. In the cases where seconds are not required, the minutes wheel is designed in saw-tooth shape and the wheel set consists only of the minutes and hour wheels. This clock does not contain any mechanical regulator, vibrator, tuning-fork stabilizer or similar device for time control. It consists exclusively of an electronic part and the recording mechanism.

Circuit arrangements with time-regulating properties have not been known heretofore since, for example, multivibrators with transistors as circuit elements can not be used for precise time-pulse generation.

The invention is characterized by the features that two silicon transistors form a bridge circuit whereby the collector-emitter-section represents by its working resistance within the collector-emitter-circuit a bridge circuit. The branches of the bridge, formed by one transistor each, are controlled so that one transistor branch of the bridge controls the base of the other transistor branch of the bridge. The circuit is arranged in such manner that a constant operating time is generated at one branch of the bridge which will control the other branch through the base of the transistor, this transistor transmitting the pulse repetition frequency to the other branch of the bridge, again through control of the base. It is particularly advantageous to employ a p-n-p and n-p-n transistor in the respective branch of the bridge circuit.

Figure 1:
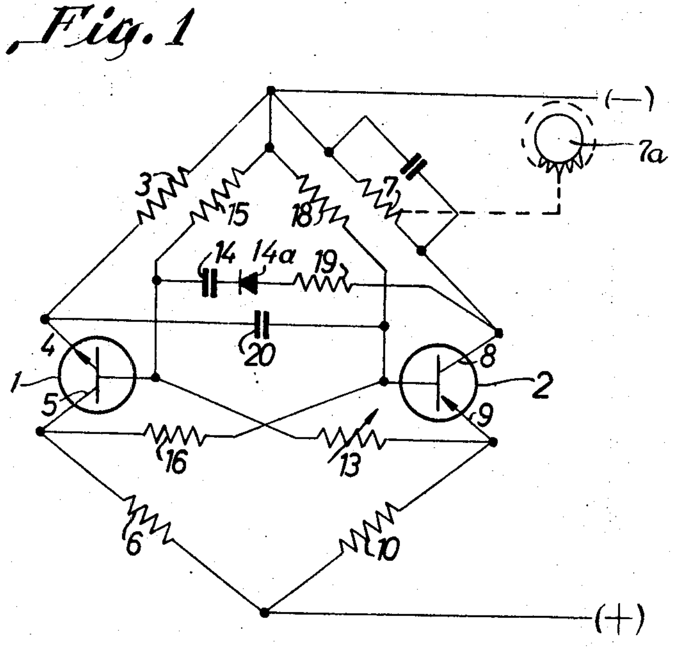

FIG. 1 discloses one embodiment of the present invention.

Figure 2:
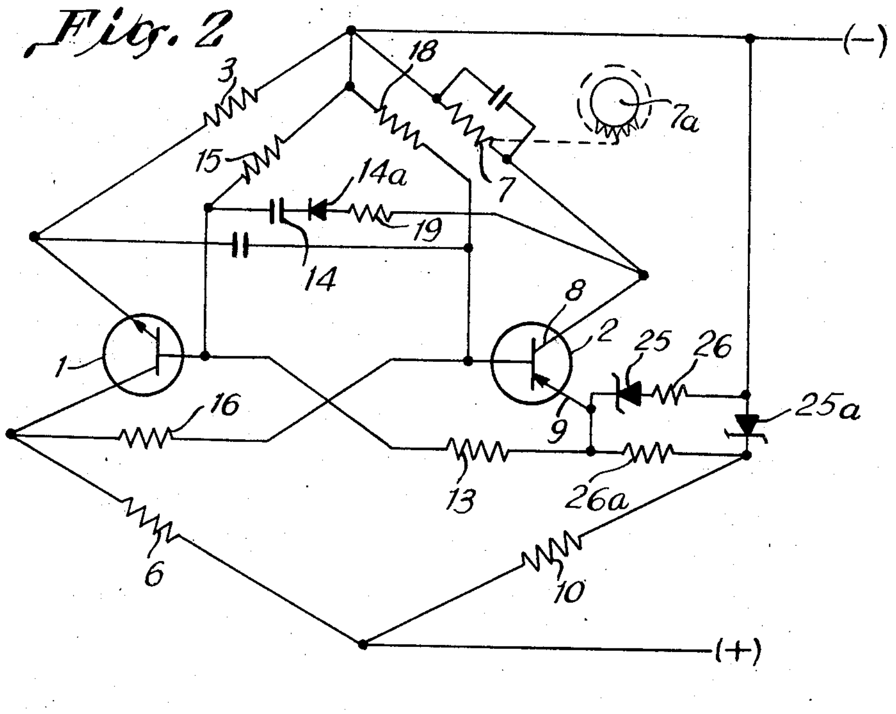

FIG. 2 shows an additional voltage stabilizing circuit that may be added to the circuit of FIG. 1.

In FIG. 1, the transistors are identified as 1 and 2, transistor 1 being an n-p-n type and transistor 2 being a p-n-p type. The branches of the bridge are formed by resistors 3, emitter 4, collector 5, and resistor 6 on one side. Resistor 7, collector 8, emitter 9, and resistor 10 form the other side of the bridge. Each branch is connected in parallel across the power supply. The control circuitry corresponds to the measurement branch of the bridge. Particularly, resistor 13 couples the emitter 9 of transistor 2 to the base of transistor 1, with resistor 15 connected to the negative side of the power supply and providing a bias for the base of transistor 1. Capacitor 14, diode

14*a*, and resistor 19 couple the base of transistor 1 to the collector 8 of transistor 2. Resistor 16 couples the collector 5 of transistor 1 to the base of transistor 2, with resistor 18 being connected to the negative side of power supply and providing bias for the base of transistor 2. Capacitor 20 couples emitter 4 of transistor 1 to the base of transistor 2.

In operation, consider both transistors as being nonconductive; the only current flowing then, aside from transistor leakage current, is through two paths. The first path comprises resistors 10, 13, and the parallel combination of resistor 15 in parallel with capacitor 14, diode 14*a*, resistors 19 and 7. The second path comprises resistors 6, 16 in series, and the combination of capacitor 20, resistor 3 in parallel with resistor 18.

The resistors are so chosen that the current in the circuit is in the micro-ampere range, and so the backward resistance of diode 14*a* is not too high to allow capacitor 14 to charge. Capacitor 20 also charges. The effect of the charge on both capacitors is to raise the base and lower the emitter voltages of transistor 1. When the base-emitter voltage of this transistor reaches the threshold voltage which is about 0.7 volt, it fires, and the positive pulse at the emitter is coupled to the base of transistor 2, allowing transistor 2 to conduct. The regenerative action causes rapid conduction. Capacitor 14 then rapidly charges from emitter 8 which is now at a high potential, through resistor 19, diode 14*a*, and resistor 15.

As charge accumulates, the base voltage of transistor 1 tends to decrease. When the threshold level is reached, conduction ceases. The negative pulse at emitter 4, coupled through capacitor 20, turns off transistor 2. The regenerative action results in an almost vertical pulse at emitter 8. The output at emitter 8 is used to drive the mechanical elements of the timepiece.

Capacitor 14 then charges in the opposite direction and eventually causes transistor 1 to conduct, and the cycle is repeated. The pulse repetition rate is determined by capacitor 14 and variable resistors 13, while pulse duration is determined by capacitor 14 and resistor 19. Since the cycle times are controlled by varying charge on the same capacitors through the use of a bridge circuit, the effect of supply voltage variations on timing is reduced.

The resistance 7 can be formed by the ohmic resistance of the driving coil. By a simple magnetic stepping device, this driving coil transmits the generated pulse to a toohed wheel on gear 7*a*, always indexing forward one tooth of the saw-toothed seconds or minutes wheel. The pulse repetition rate is determined by the charge of the capacitor 14 through the resistor 13. Since the two transistors are controlled through the actual measuring bridge branches, the control will be substantially independent of the voltage as in the case of regular bridge circuits. The amplification factors of the transistors do not enter into this setup because for practical purposes only the threshold voltage—which in case of the material—constant for silicon is approximately 0.7 volt—is the decisive factor for cutting—in one or the other transistor. The arrangement results in a pulse repetition and a duration of the drive pulse proper which have a great constancy.

Obviously, it is also feasible to stabilize specifically the voltage across the resistor 13, and this can be accomplished in a most simple manner, by incorporating a Zener diode voltage stabilization circuit to insure continuous constancy of the charging voltage which is picked up at the resistor 10 and is conducted to the base of transistor 1. This can be accomplished in a suitable manner as shown in FIG. 2 by placing a resistor 26 in series with the Zener diode 25 which has a potential of approximately 1.2 volts. The resistor 26 is connected to the minus terminal of the power supply and another series resistor 26a is connected to the plus terminal of the power supply and another series resistor 26a is connected to the plus terminal of the power supply. This series combination of diode 25 and resistors 26 and 26a is connected in parallel with another resistors 26 and 26a is connected in parallel with another Zener diode 25a so that a constant current flow as well as a constant potential is maintained at the Zener diode, with the combination resistor 13 and capacitor 14 being connected thereto. A voltage stabilization of this type will attain accuracies in pulse repetition, rate and operation frequency at a degree unattainable even by means of mechanical vibrators such as tuning forks and the like. The power load of all resistors is very low, less than 1 to 2% of their rated value, so that fluctuations in resistance due to heat or fatiguing will not occur. The capacitor 14, not being under stress by heat or full load, likewise will be free of fatiguing. Such phenomena can occur in case of capacitors only if the electrolytic capacitor becomes heated either by ambient temperature—as happens in case of other electronic or electrical equipment—or heat generated by the current proper, causing the electrolyte to desiccate. However, since the capacitor is under a load which represents only a very small fraction of its productive capacity, there is no possibility at all of its aging.

In order to insure absolute symmetry of the circuit, there is connected a capacitor 20 from the measuring bridge point 4 to the base of the second transistor 2. As a result of this arrangement the voltages and currents within the measuring bridge branch, which is utilized as control branch for the transistors, will always be balanced and the bridge will normally be in a state of equilibrium, only its switching positions changing from one to the other transistor. Since the bridge is highly sensitive due to the amplification factor arising at each transistor, switching operations will be extraordinarily precise and instantaneous at properly high power so that very sharp square-topped pulses are generated without any looping and without any trace of a starting or ending oscillation. The sides rise vertically. Ideal switching pulses are generated, not interspersed with any transient phenomena.

The temperature control of the circuitry can be accomplished in simple and known manner by the incorporation of NTC-resistors. These NTC-resistors will equalize any differences in the threshold voltage of the transistors at the base of the transistors so that the time constants will remain constant absolutely over a wide range which can be fixed by means of the degree of attenuation of the temperature-related semi-conducting resistors.

The coefficients of resistance of the individual resistors specified are not critical. It is, therefore, possible to employ standard resistors without specification of close tolerances, and since the resistors are subjected to extremely low loads, the smallest, very inexpensive milliwatt resistors can be used in the circuitry so that the costs are very low, the only exception being the two transistors. Total expenditures for the electronic circuitry are substantially lower than the expenditure for a mechanical vibrator.

If printed circuits are employed, the electronic components can be manufactured and aligned separately, in other words can be installed as one unit in the mechanical portion of the clock by mass-production. The power consumption of such a circuit arrangement is on the order of microamperes during the period when the drive pulse circuit is not closed. Practically speaking, it is in the range from about 2 to 5 microamperes. The resistance 7 in the form of the drive coil requires 1 to 1½ milliampere for a pulse duration of 25 to 50 milliseconds to operate the stepping mechanism for advancing one saw-tooth. Therefore, current consumption is so low that a standard battery, normally used for clocks of this type, will last for many years, practically limited only by the self-destruction of the battery. If the switching of seconds is omitted—as in case of many clocks—and switching by minutes is used, an arrangement whereby solely the resistor and capacitor values for the control of the base will change relative to magnitude, the power consumption will be 1/60 of the power consumption as required by seconds-switching, so that it becomes immaterial for all practical purposes. In comparison with clocks of different design, operating by means of mechanical vibrators, the total current consumption of the circuit is negligible. After all, the control currents for silicon transistors are on the order of microamperes, and the actual switching pulse does not occur several times per second—either 2½, 5 or more times—but only once per second; and the advantages of such circuitry are extraordinarily great. Clocks with such bridge circuits from transistors as time pulse producers can not be compared with mechanical clocks since even temperature variations, for example of helical springs or other components of mechanical vibrators, can not occur. It is a fully electronic circuit arrangement which transmits at maximum accuracy time pulses of a desired duration to a drive system for forward movement of a very simple time clock work. All resistances are relatively high ohmic values in magnitudes up to 500K ohms and 1 megohm. Only the resistances 19 and 13 require computation for setting the series of pulses and switching time but will not change at the specified control of the transisors. The values, after being determined once for a specific series of pulses and switching time, will remain unchanged, and it will be expedient to select the two resistors with close tolerances because then a very brief period of time will be required to adjust the second or minute for the electronic pulse transmission, thereby saving substantial costs connected with regulation of the clock.

Obviously, the circuit arrangement can be used for any type of clock because miniaturized silicon transistors, resistors, capacitors etc. are available. Tantalum capacitors of extremely small size are available, and the resistors are likewise very small or can also be incorporated in the printed circuit. Therefore, the circuitry can be installed in a very small space and is suitable for any type of clock, including car clocks or clocks operating at non-standard voltages. In order to uniformly employ identical electronic circuitry and identical clock works, it is possible in case of non-standard voltages, for example in case of car clocks, to reduce the voltages to the value used by the circuitry by means of a simple pre-resistor. Obviously, it is also feasible in case of higher voltages to stabilize the entire circuit by use of a Zener diode circuit arrangement whereby the Zener diode voltage is selected to conform with the existing battery potential. The application of the circuit principle is practically unlimited by the type of clock, and the circuit can be used even for industrial time switches requiring high precision for seconds, minutes or hours. In this case the resistor 7 is designed as a relay coil for the tripping of a switch 7a. A damping of the entire system is not needed since high- or low-frequency oscillations at opening or closing time can not occur. Only in case of very high self-induction values of the drive coil 7 will it be advisable to connect a capacitor in parallel across the coil to avoid any adverse reaction of the self-induction on the stability of the bridge. Fluctuations in the feeder voltage, not exceeding 20%, will not—as is is well known—substantially affect the constancy of a bridge within the controlling measuring bridge branch, that is in case of the invention the branches controlling the bases of the transistors. By stabilization, as described above, the percentage can be increased substantially so that the normal voltage drops which occur in standard dry batteries during their life time will not influence the accuracy of the pulse-transmitting circuit. Extensive tests of other circuits have shown that it is impossible to produce or to develop purely electronic pulse transmitters of comparable accuracy in any other manner than by use of a bridge circuit arrangement as described in the application.

In connection with the stabilizing circuit shown by FIG. 2 it is pointed out that, in contrast to other standard circuits, it becomes necessary, due to the exraordinarily low current required for the supply through the resistor 13—this resistor ranging in magnitude from 600K ohms to 1 megohm—to modify the normal circuit in such manner that the Zener diode 25 is provided with a pre-resistor 26 to the plus terminal as well as with a resistor 26*a* to the minus terminal, so that the diode 25 is not current-operated within a zone where the curved portion of its characteristic would be operative. The characteristic of the point at which the circuit is operating is rendered immaterial for voltage regulation purposes by the specific fixing of the current flowing through the diode.

In one actually constructed embodiment of the invention, the combination of FIG. 1 was constructed with the components therein having the following values:

Resistor 3—1000 ohms.
Resistor 15—1 megohm.
Resistor 18—100,000 ohms.
Resistor 7—1000 ohms.
The capacitor in parallel with resistor 7—0.25 microfarad.
Capacitor 14—0.5 microfarad.
Diode 14*a*—0.6 volt.
Resistor 19—20,000 ohms.
Capacitor 20—1 megohm.
Resistor 16—10,000 ohms.
Potentiometer 13—600,000 ohms, 1 megohm.
Resistor 6—100,000 ohms.
Resistor 10—500 ohms.
Power source—1.5 volts.
Amplification constant of transistors 1 and 2—100–500.

With reference to FIG. 2, a specific embodiment of the combination there disclosed had its components of the same values as indicated above for FIG. 1, except for the following:

Resistor 26*a*—50,000 ohms.
Zener diode 25—10 ohms, 1.2 volts.
Resistor 26—10 ohms.
Zener diode 25*a*—10 ohms, 1.2 volts.
Resistor 10—50,000 ohms.

What is claimed is:

1. A transistorized electronic clock oscillator of the type having two transistors and alternating oppositely between two astable conditions in one of which both said transistors are conductive and in the other of which both said transistors are non-conductive comprising, a pair of silicon transistors, a power supply, resistance means coupling the emitter and the collector of each said transistor to respectively opposite terminals of the power supply to form a bridge circuit, first coupling means comprising resistance and capacitance in series and coupled between the emitter-collector circuit of one said transistor to the base of the other transistor, second coupling means comprising resistance and capacitance means being series-connected between the base and emitter of said other transistor and having their junctions connected to the base of said one transistor, and resistive coupling means connected between the base of said other transistor and the collector-emitter circuit of said one transistor, and biasing means connecting the base of each transistor to a terminal of said power supply.

2. An electronic clock according to claim 1 wherein a resistance means is connected in series with the collector-emitter circuit of said one transistor comprises a drive coil adapted to magnetically step a saw-toothed wheel.

3. An electronic clock according to claim 1 including voltage stabilization means comprising a Zener diode coupled to said resistive coupling means, and dropping resistor means connected between said power supply means and said Zener diode.

4. An electronic clock according to claim 1 wherein one of said two transistors is of the p-n-p type, and the other of said transistors is of the n-p-n type.

5. An electronic clock according to claim 1 including means for effecting a precise time adjustment of pulse repetition frequency, wherein said resistive coupling means comprises a variable resistor means.

References Cited

UNITED STATES PATENTS

| | | | |
|---|---|---|---|
| 3,038,127 | 6/1962 | Wofford | 331—110 |
| 3,131,362 | 4/1964 | Dersch | 331—108 |
| 3,225,536 | 12/1965 | Reich | 58—23 |
| 3,229,225 | 1/1966 | Schimpf | 331—108 |
| 3,241,087 | 3/1966 | Gossel | 331—113 |
| 3,319,184 | 5/1967 | McCall | 331—113 |
| 3,319,185 | 5/1967 | Anderson et al. | 331—186 |

JOHN KOMINSKI, Primary Examiner

U.S. Cl. X.R.

58—23; 331—111